(12) United States Patent
Han et al.

(10) Patent No.: US 10,048,796 B2
(45) Date of Patent: Aug. 14, 2018

(54) TOUCH MODULE, TOUCH SCREEN PANEL, TOUCH POSITIONING METHOD THEREOF AND DISPLAY DEVICE

(71) Applicants: BOE Technology Group Co., Ltd., Beijing (CN); Beijing BOE Optoelectronics Technology Co., Ltd., Beijing (CN)

(72) Inventors: Peng Han, Beijing (CN); Xiurong Wang, Beijing (CN); Bo Gao, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 72 days.

(21) Appl. No.: 15/102,377

(22) PCT Filed: Jan. 5, 2016

(86) PCT No.: PCT/CN2016/070123
§ 371 (c)(1),
(2) Date: Jun. 7, 2016

(87) PCT Pub. No.: WO2017/012294
PCT Pub. Date: Jan. 26, 2017

(65) Prior Publication Data
US 2017/0205931 A1    Jul. 20, 2017

(30) Foreign Application Priority Data
Jul. 20, 2015   (CN) .......................... 2015 1 0427884

(51) Int. Cl.
*G06F 3/045*   (2006.01)
*G06F 3/041*   (2006.01)
*G06F 3/044*   (2006.01)

(52) U.S. Cl.
CPC ............ G06F 3/0416 (2013.01); G06F 3/044 (2013.01); G06F 3/0412 (2013.01); *G06F 2203/04104* (2013.01)

(58) Field of Classification Search
CPC ...... G06F 3/0416; G06F 3/0412; G06F 3/044; G06F 2203/04104
(Continued)

(56) References Cited

U.S. PATENT DOCUMENTS

2013/0120308 A1*   5/2013   Wang ...................... G06F 3/044
345/174

FOREIGN PATENT DOCUMENTS

| CN | 101799733 A | 8/2010 |
| CN | 101833408 A | 9/2010 |

(Continued)

OTHER PUBLICATIONS

Jun. 28, 2017—(CN) Office Action, Application 201510427884.3 with English translation.
(Continued)

*Primary Examiner* — Mark Regn
(74) *Attorney, Agent, or Firm* — Banner & Witcoff, Ltd.

(57) ABSTRACT

A touch module, a touch screen panel, a touch positioning method thereof and a display device are disclosed. The touch module includes a plurality of first touch electrode lines and a plurality of second touch electrode lines which are intersected with and insulated from each other; a plurality of third touch electrode lines which are intersected with and insulated from the first touch electrode lines and the second touch electrode lines; intersections of orthographic projections of the plurality of first touch electrode lines on a film layer provided with the third touch electrode lines and orthographic projections of the plurality of second touch electrode lines on the film layer provided with the third
(Continued)

touch electrode lines are located on the third touch electrode lines.

15 Claims, 4 Drawing Sheets

(58) Field of Classification Search
USPC .......................................................... 345/174
See application file for complete search history.

(56) References Cited

FOREIGN PATENT DOCUMENTS

| | | |
|---|---|---|
| CN | 201773380 U | 3/2011 |
| CN | 102331886 A | 1/2012 |
| CN | 102375587 A | 3/2012 |
| CN | 102436325 A | 5/2012 |
| CN | 104657006 A | 5/2015 |
| CN | 104965623 A | 10/2015 |
| TW | 201124894 A | 7/2011 |

OTHER PUBLICATIONS

Mar. 24, 2016—(WO)—International Search Report and Written Opinion Appn PCT/CN2016/070123 with English Tran.

\* cited by examiner

TOUCH MODULE, TOUCH SCREEN PANEL, TOUCH POSITIONING METHOD THEREOF AND DISPLAY DEVICE

The application is a U.S. National Phase Entry of International Application No. PCT/CN2016/070123 filed on Jan. 5, 2016, designating the United States of America and claiming priority to Chinese Patent Application No. 201510427884.3, filed Jul. 20, 2015. The present application claims priority to and the benefit of the above-identified applications and the above-identified applications are incorporated by reference herein in their entirety.

TECHNICAL FIELD

Embodiments of the present disclosure relate to a touch module, a touch screen panel, a touch positioning method thereof and a display device.

BACKGROUND

With a rapid development of display technology, touch screen panels have been widely applied in people's lives. According to principles, the touch screen panels may be classified into: capacitive sensing touch screen panels, resistive sensing touch screen panels, optical sensing touch screen panels, and the like, wherein the capacitive sensing touch screen panels may further include a self-capacitance sensing touch screen panel and a mutual-capacitance sensing touch screen panel. Compared with the mutual-capacitance sensing touch screen panel, the self-capacitance sensing touch screen panel has higher touch signal-to-noise ratio (SNR) and higher touch sensing accuracy.

SUMMARY

Embodiments of the present disclosure provide a touch module, a touch screen panel, a touch positioning method thereof and a display device, which are used for allowing the self-capacitance sensing touch screen panel to implement a multi-touch function.

An embodiment of the present disclosure provides touch module, comprising: a plurality of first touch electrode lines and a plurality of second touch electrode lines which are intersected with and insulated from each other; a plurality of third touch electrode lines which are intersected with and insulated from the first touch electrode lines and the second touch electrode lines; wherein intersections of orthographic projections of the plurality of first touch electrode lines on a film layer provided with the third touch electrode lines and orthographic projections of the plurality of second touch electrode lines on the film layer provided with the third touch electrode lines are located on the third touch electrode lines.

For example, in the touch module provided by the embodiment of the disclosure, a film layer provided with the plurality of first touch electrode lines, a film layer provided with the plurality of second touch electrode lines and the film layer provided with the plurality of third touch electrode lines are disposed in different layers. The touch module further comprises insulating layers disposed among the film layer provided with the plurality of first touch electrode lines, the film layer provided with the plurality of second touch electrode lines and the film layer provided with the plurality of third touch electrode lines.

For example, in the touch module provided by the embodiment of the disclosure, the plurality of third touch electrode lines are disposed in the same film layer; and the plurality of third touch electrode lines are parallel to each other.

For example, in the touch module provided by the embodiment of the disclosure, the intersections of the orthographic projections of the plurality of first touch electrode lines on the film layer provided with the plurality of third touch electrode lines and the orthographic projections of the plurality of second touch electrode lines on the film layer provided with the plurality of third touch electrode lines are respectively located on different third touch electrode lines.

For example, in the touch module provided by the embodiment of the disclosure, the plurality of third touch electrode lines are disposed in at least two film layers; the third touch electrode lines in a same film layer are parallel to each other; and the third touch electrode lines in different film layers are intersected with each other.

An embodiment of the present disclosure provides a touch screen panel, comprising: the touch module according to the embodiments of the disclosure.

For example, the touch screen panel provided by the embodiment of the disclosure further comprises a display panel, wherein the display panel comprises an upper substrate and a lower substrate which are disposed opposite to each other; and the touch module is disposed on a side of the upper substrate facing the lower substrate; or the touch module is disposed on a side of the lower substrate facing the upper substrate.

An embodiment of the present disclosure provides a display device, which comprises the touch screen panel according to the embodiment of the present disclosure.

An embodiment of the present disclosure further provides a touch positioning method of the touch screen panel according to the embodiment of the present disclosure, comprising: applying touch driving signals on the plurality of first touch electrode lines and the plurality of second touch electrode lines respectively; detecting variations of voltage signals of the touch driving signals, coupled by the plurality of first touch electrode lines and the plurality of second touch electrode lines through first inductive capacitors; and when the variations of the voltage signals on at least two of the plurality of first touch electrode lines and at least two of the plurality of second touch electrode lines are detected, applying touch driving signals on the plurality of third touch electrode lines respectively, detecting the variations of the voltage signals of the touch driving signals coupled by the plurality of third touch electrode lines through second inductive capacitors, and determining the contact positions of the touch screen panel according to the first touch electrode lines, the second touch electrode lines and the third touch electrode lines from which the variations of the voltage signals are detected.

For example, the touch positioning method provided by the embodiment of the disclosure further comprises: upon determining the variations of the voltage signals on only one of the plurality of first touch electrode lines and at least one of the plurality of second touch electrode lines or determining the variations of the voltage signals on at least one of the plurality of first touch electrode lines and only one of the plurality of second touch electrode lines, determining the contact positions of the touch screen panel according to the first touch electrode lines and the second touch electrode lines from which the variations of the voltage signals are detected.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

A self-capacitance sensing touch screen panel is provided with a plurality of first touch electrode lines and a plurality of second touch electrode lines which are intersected with and insulated from each other. A method for determining contact positions by the self-capacitance sensing touch screen panel is as follows: voltage signals coupled by the plurality of first touch electrode lines and the plurality of second touch electrode lines through inductive capacitors are detected respectively, when touch driving signals are applied on the plurality of first touch electrode lines and the plurality of second touch electrode lines respectively. In the process, when human body contacts the touch screen panel, an electric field of the human body will be applied on the inductive capacitors, so that the capacitance of the inductive capacitors varies, and thus the voltage signals coupled by corresponding first touch electrode lines and corresponding second touch electrode lines can be changed. Therefore, the contact positions can be determined according to variations of the voltage signals. The method can only implement a single-touch function and cannot implement a multi-touch function. For example, four contact positions will be determined when the variations of voltage signals on two first touch electrode lines and two second touch electrode lines are detected. The four contact positions may also include ghost points besides real contacts.

Currently, the self-capacitance sensing touch screen panel generally implements a multi-touch function by algorithm. For example, contact positions of two fingers are distinguished according to a time difference between touchings of the two fingers, or the positions of two contacts are distinguished according to the fact that the two contacts move towards different directions respectively. However, when the time difference between the touchings of the two fingers is very small and even the two fingers touch simultaneously, or when the two contacts move towards the same direction, the self-capacitance sensing touch screen panel cannot determine the positions of a plurality of contacts by the algorithm, and hence cannot implement a multi-touch function.

Therefore, a technical problem to be solved by those skilled in the art is that how the self-capacitance sensing touch screen panel can implement a multi-touch function under any condition.

Detailed embodiments of the touch module, the touch screen panel, the touch positioning method thereof and the display device, provided by the embodiments of the present disclosure will be described in details, with reference to the drawings. Shapes and the thicknesses of film layers in the drawings do not reflect real scale and are only intended to illustrate the content of the present disclosure.

Figure 1:
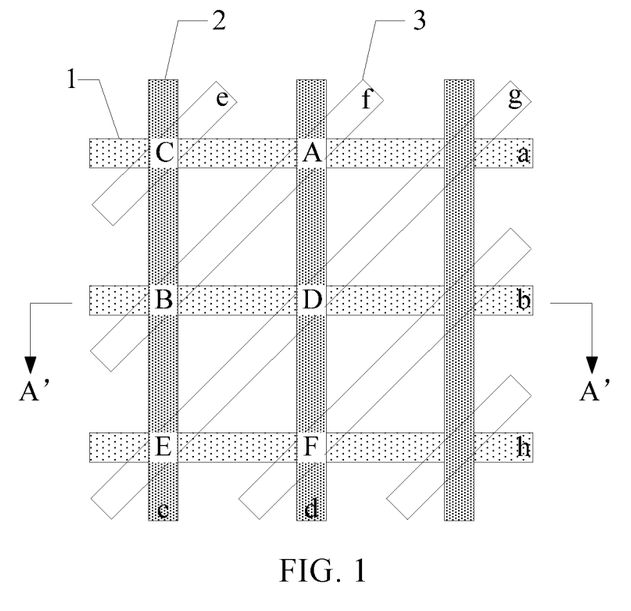
FIG. 1 is a structural schematic view of a touch module provided by an embodiment of the present disclosure.
Figure 2A:
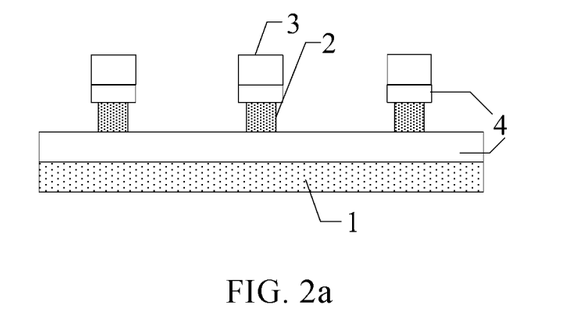
FIGS. 2a and 2b are sectional views of FIG. 1 along the A'A' direction.
Figure 2B:
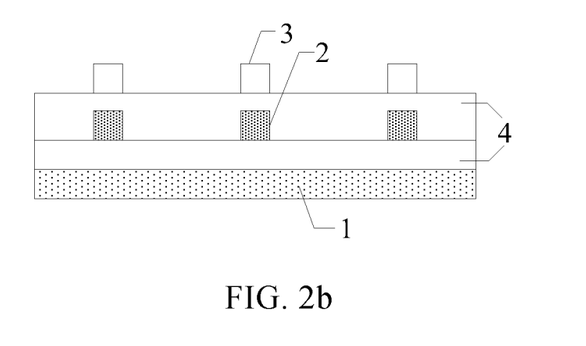
Figure 2C:
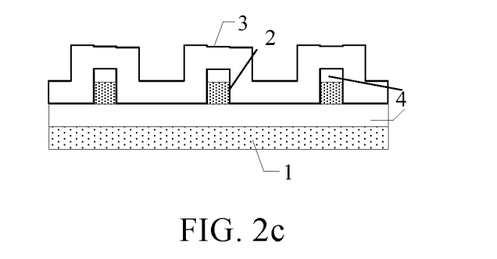
FIG. 2c is a sectional view of FIG. 1 along the direction BB.

The embodiments of the present disclosure provide a touch module. As illustrated in FIGS. 1 and 2 (FIG. 2 is a sectional view of FIG. 1 along the A'A' direction), the touch module comprises a plurality of first touch electrode lines 1 and a plurality of second touch electrode lines 2 which are intersected with and insulated from each other. The touch module further comprises a plurality of third touch electrode lines 3 which are intersected with and insulated from the first touch electrode lines 1 and the second touch electrode lines 2. Intersections of orthographic projections of the plurality of first touch electrode lines 1 on a film layer provided with the third touch electrode lines 3 and orthographic projections of the plurality of second touch electrode lines 2 on the film layer provided with the third touch electrode lines 3 are disposed on the third touch electrode lines 3.

In the touch module provided by the embodiments of the present disclosure, when touch driving signals are respectively applied to the plurality of first touch electrode lines and the plurality of second touch electrode lines, voltage signals coupled by the plurality of first touch electrode lines and the plurality of second touch electrode lines through first inductive capacitors are respectively detected. When variations of the voltage signals on at least two of the plurality of first touch electrode lines and at least two of the plurality of second touch electrode lines are detected, there may be ghost points in contacts determined according to intersections of the at least two of the plurality of first touch electrode lines and the at least two of the plurality of second touch electrode lines. That is, the contact positions cannot be accurately determined by the first touch electrode lines and the second touch electrode lines. Thus, the touch driving signals shall be applied to a plurality of third touch electrode lines, and voltage signals coupled by the plurality of third touch electrode lines through second inductive capacitors are detected. The intersections of the orthographic projections of the plurality of first touch electrode lines on the film layer provided with the third touch electrode lines and the orthographic projections of the plurality of second touch electrode lines on the film layer provided with the third touch electrode lines are disposed on the third touch electrode lines. Thus, coordinates of the plurality of third touch electrode lines can be calculated according to coordinates of the intersections and the an angle between the third touch electrode lines and the first touch electrode lines (or the second touch electrode lines), and then the contact positions can be accurately determined according to the first touch electrode lines, the second touch electrode lines and the third touch electrode lines from which the variations of the voltage signals are detected. Moreover, in the embodiments of the present disclosure, the positions of a plurality of contacts are not determined by algorithm, so that the touch screen panel can implement a multi-touch function under any condition, and the touch screen panel can implement operations such as zooming, shifting and rotation.

For example, in the touch module provided by the embodiment of the present disclosure, a film layer provided with the plurality of first touch electrode lines, a film layer provided with the plurality of second touch electrode lines and a film layer provided with the plurality of third touch electrode lines may be disposed in the same layer. As illustrated in FIG. 2a, insulating spacers are disposed between second touch electrode lines 2 and third touch electrode lines 3, and the film layer provided with the plurality of second touch electrode lines 2 and the film layer provided with the plurality of third touch electrode lines 3 may be disposed in the same layer. Also, as illustrated in FIG. 2b, the film layer provided with the plurality of first touch electrode lines 1, the film layer provided with the plurality of second touch electrode lines 2 and the film layer provided with the plurality of third touch electrode lines 3 may be disposed in different layers, and the embodiments of the disclosure are not limited herein, as long as the plurality of first touch electrode lines, the plurality of second touch electrode lines and the plurality of third touch electrode lines are insulated from each other. FIG. 2c is a sectional view of FIG. 1 along the BB direction.

For example, as illustrated in FIG. 2b, when the film layer provided with the plurality of first touch electrode lines 1, the film layer provided with the plurality of second touch electrode lines 2 and the film layer provided with the plurality of third touch electrode lines 3 are disposed in different layers, the touch module provided by the embodiments of the present disclosure may further comprise: insulating layers 4 disposed among the film layer provided with the plurality of first touch electrode lines 1, the film layer provided with the plurality of second touch electrode lines 2 and the film layer provided with the plurality of third touch electrode lines 3. For example, as illustrated in FIG. 2b, one of the insulating layer 4 is disposed between the film layer provided with the plurality of first touch electrode lines 1 and the film layer provided with the plurality of second touch electrode lines 2, and other one of the insulating layer 4 is disposed between the film layer provided with the plurality of second touch electrode lines 2 and the film layer provided with the plurality of third touch electrode lines 3.

For example, in the touch module provided by the embodiments of the present disclosure, as illustrated in FIGS. 1, 2a and 2c, the plurality of third touch electrode lines 3 are disposed in the same layer and parallel to each other. For example, when touch driving signals are respectively applied to the plurality of first touch electrode lines 1 and the plurality of second touch electrode lines 2, the voltage signals coupled by the plurality of first touch electrode lines 1 and the plurality of second touch electrode lines 2 through first inductive capacitors are respectively detected. When the human body contacts an A point and a B point simultaneously, variations of voltage signals on a first touch electrode line a, a first touch electrode line b, a second touch electrode line c and a second touch electrode line d may be detected. Four contacts A, B, C and D can be determined according to the first touch electrode line a, the first touch electrode line b, the second touch electrode line c and the second touch electrode line d, and there are two ghost points among the four contacts. When touch driving signals are applied to the plurality of third touch electrode lines 3 and voltage signals coupled by the plurality of third touch electrode lines 3 through second inductive capacitors are detected, variations of a voltage signal on a third touch electrode line f can be detected. Therefore, an intersection A of the third touch electrode line f, the first touch electrode line a and the second touch electrode line d and an intersection B of the third touch electrode line f, the first touch electrode line b and the second touch electrode line c are real contacts. And voltage signals on a third touch electrode line e and a third touch electrode line g are not changed, therefore both an intersection C of the third touch electrode line e, the first touch electrode line a and the second touch electrode line c and an intersection D of the third touch electrode line g, the first touch electrode line b and the second touch electrode line d are ghost points. Therefore, the ghost points can be accurately excluded and the contact positions can be accurately determined.

It should be noted that, the touch module as shown in FIG. 1 and FIGS. 2a to 2c can accurately determine the positions of two contacts for a two-contact touch function, however, ghost points may be still included in the contacts determined by the touch module for a three-point touch function or a multi-touch function, as shown in FIG. 1 and FIGS. 2a to 2c. For example, when touch driving signals are respectively applied to the plurality of first touch electrode lines 1 and the plurality of second touch electrode lines 2, voltage signals coupled by the plurality of first touch electrode lines 1 and the plurality of second touch electrode lines 2 through first inductive capacitors are respectively detected. When the human body contacts points A, B and E simultaneously, the variations of the voltage signals on a first touch electrode line a, a first touch electrode line b, a first touch electrode line h, a second touch electrode line c and a second touch electrode line d can be detected. Thus, six contacts A, B, C, D, E and F can be determined according to the first touch electrode line a, the first touch electrode line b, the first touch electrode line h, the second touch electrode line c and the second touch electrode line d, and there are three ghost points in the six contacts. When touch driving signals are applied to the plurality of third touch electrode lines 3 and voltage signals coupled by the plurality of third touch electrode lines 3 are coupled through second inductive capacitors, variations of voltage signals on a third touch electrode line f and a third touch electrode line g can be detected. Thus, in an intersection A of the third touch electrode line f, the first touch electrode line a and the second touch electrode line d, an intersection B of the third touch electrode line f, the first touch electrode line b and the second touch electrode line c, an intersection D of the third touch electrode line g, the first touch electrode line b and the second touch electrode line d, and an intersection E of the third touch electrode line g, the first touch electrode line h and the second touch electrode line c, the touch module as shown in FIG. 1 and FIGS. 2a to 2c cannot determine the D point to be a ghost point.

Figure 3:
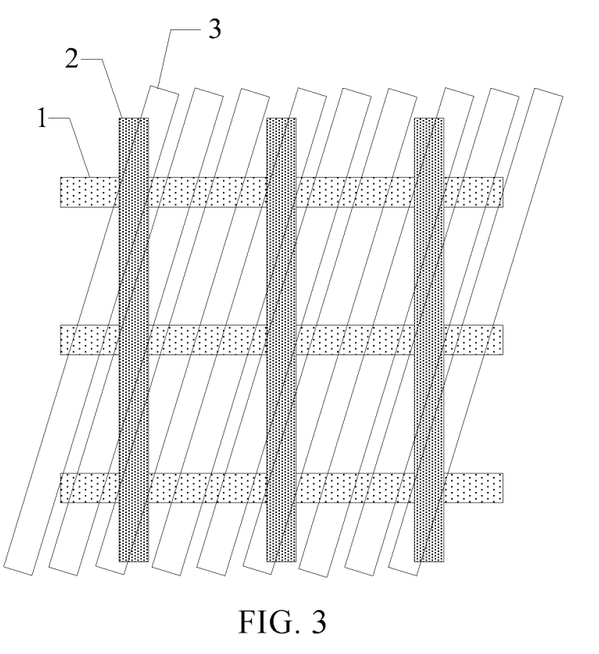
FIG. 3 is a structural schematic view of another touch module provided by an embodiment of the present disclosure.

Thus, in the touch module provided by the embodiment of the present disclosure, as illustrated in FIG. 3, the intersections of the orthographic projections of the plurality of first touch electrode lines 1 on the film layer provided with the plurality of third touch electrode lines 3 and the orthographic projections of the plurality of second touch electrode lines 2 on the film layer provided with the plurality of third touch electrode lines 3 may be respectively disposed on different third touch electrode lines 3. That is, the intersections of the orthographic projections of the plurality of first touch electrode lines 1 on the film layer provided with the plurality of third touch electrode lines 3 and the orthographic projections of the plurality of second touch electrode lines 2 on the film layer provided with the plurality of third touch electrode lines 3 are in one-to-one correspondence with the third touch electrode lines 3. Thus, no matter it is a two-point touch, a three-point touch or even a multi-touch, the touch module as shown in FIG. 3 can accurately exclude ghost points and accurately determine the contact positions by the detection of the variations of the voltage signals on the third touch electrode lines 3.

It should be noted that, in the touch module as shown in FIG. 3, the number of the third touch electrode lines is large. Therefore, the manufacturing process of the touch module may be more difficult, and the requirement on the accuracy of the manufacturing process of the third touch electrode lines is higher.

Figure 4A:
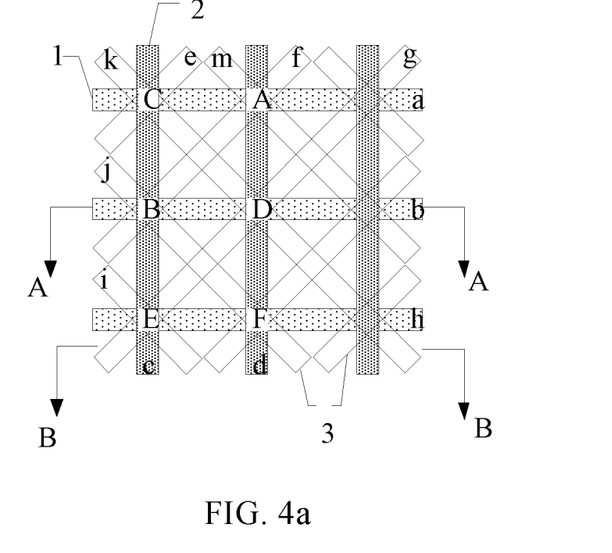
FIG. 4a is a structural schematic view of still another touch module provided by an embodiment of the present disclosure.
Figure 4B:
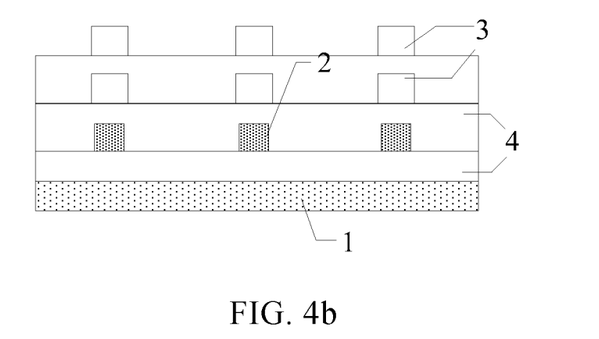
FIG. 4b is a sectional view of FIG. 4a along the direction AA.
Figure 4C:
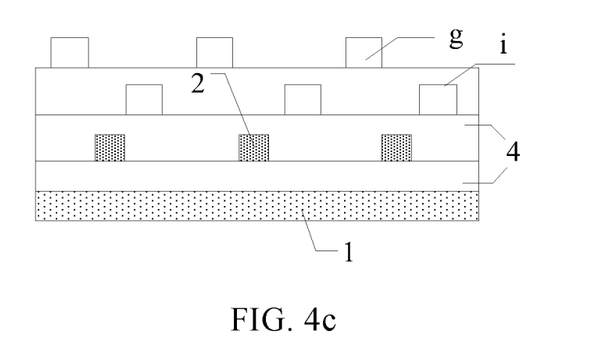
FIG. 4c is a sectional view of FIG. 4a along the direction BB.

Thus, in the touch module provided by the embodiments of the present disclosure, as illustrated in FIGS. 4a, 4b and 4c, the plurality of third touch electrode lines 3 are disposed in at least two film layers (FIGS. 4b and 4c take a case of the plurality of third touch electrode lines being disposed in two film layers as an example). The third touch electrode lines 3 in a same film layer are parallel to each other, and the third touch electrode lines 3 in different film layers are intersected with each other. For example, when touch driving signals are respectively applied to the plurality of first touch electrode lines 1 and the plurality of second touch electrode lines 2, voltage signals coupled by the plurality of first touch electrode lines 1 and the plurality of second touch electrode lines 2 through first inductive capacitors are respectively detected. When the human body contacts points A, B and E simultaneously, the variations of voltage signals on a first touch electrode line a, a first touch electrode line b, a first touch electrode line h, a second touch electrode line c and a second touch electrode line d can be detected. Thus, six contacts A, B, C, D, E and F can be determined according to the first touch electrode line a, the first touch electrode line b, the first touch electrode line h, the second touch electrode line c and the second touch electrode line d, and there are three ghost points in the six contacts. When touch driving signals are applied to the plurality of third touch electrode lines 3 in the first layer (e.g., e, f and g in FIG. 4) and voltage signals coupled by the plurality of third touch electrodes 3 in the first layer through third inductive capacitors are detected, the variation of voltage signals on the third touch electrode line f and the third touch electrode line g can be detected. Thus, four contacts A, B, D and E can be determined according to the first touch electrode line a, the first touch electrode line b, the first touch electrode line h, the second touch electrode line c, the second touch electrode line d, the third touch electrode line f and the third touch electrode line g, and there is one ghost point in the four contacts. When touch driving signals are applied to the plurality of third touch electrode lines 3 in the second layer (e.g., i, j, k and m in FIG. 4) and voltage signals coupled by the plurality of third touch electrode lines 3 in the second layer through third inductive capacitors are detected, the variations of voltage signals on the third touch electrode line i, the third touch electrode line j and the third touch electrode line m can be detected, and the voltage signal on the third touch electrode line k is not changed. Thus, the ghost point D can be excluded and the points A, B and E are determined to be real contacts.

It should be noted that, in the touch module as shown in FIG. 4, an insulating layer may be disposed between two film layers of the third touch electrode lines so as to ensure that the third touch electrode lines in different film layers are insulated from each other.

Based on a same disclosure concept, the embodiments of the present disclosure further provide a touch screen panel. The touch screen panel comprises the touch module provided by the embodiments of the present disclosure. The embodiments of the touch screen panel may refer to the embodiments of the touch module, and description of which is omitted herein.

For example, the touch screen panel provided by the embodiments of the present disclosure may further comprise a display panel. The display panel may include an upper substrate and a lower substrate which are disposed opposite to each other. The touch module may be disposed on a side of the upper substrate facing the lower substrate, or the touch module may also be disposed on a side of the lower substrate facing the upper substrate. The embodiments of the disclosure are not limited herein. That is, the touch screen panel provided by the embodiments of the present disclosure is an in-cell touch screen panel.

Specifically, the touch screen panel provided by the embodiments of the present disclosure may be applied to any one of flat-panel display panels, such as a liquid crystal display (LCD), an organic light-emitting diode (OLED) display panel and a plasma display panel (PDP). The embodiments of the disclosure are not limited herein. Taking a case of the touch screen panel provided by the embodiments of the present disclosure being applied to an LCD as an example, the touch module may be disposed on a side of an opposing substrate in the LCD facing an array substrate, or the touch module may also be disposed on a side of the array substrate in the LCD facing the opposing substrate. The embodiments of the disclosure are not limited herein.

Of course, the touch screen panel provided by the embodiments of the present disclosure is not limited to the in-cell touch screen panel and may also be an on-cell touch screen panel. Or the touch screen panel may also be an add-on touch screen panel. The embodiments of the disclosure are not limited herein. In this case, the touch module is disposed on a display side of the display panel. Similarly, the display panel may be any one of the flat-panel display panels, such as the LCD, the OLED and the PDP.

The embodiments of the present disclosure further provide a display device. The display device comprises the touch screen panel provided by the embodiments of the present disclosure. The display device may be: any product or component with a display function, such as a mobile phone, a tablet PC, a TV, a display, a notebook computer, a digital picture frame and a navigator. The embodiments of the display device may refer to the embodiments of the touch screen panel, description of which will be omitted herein.

Figure 5:
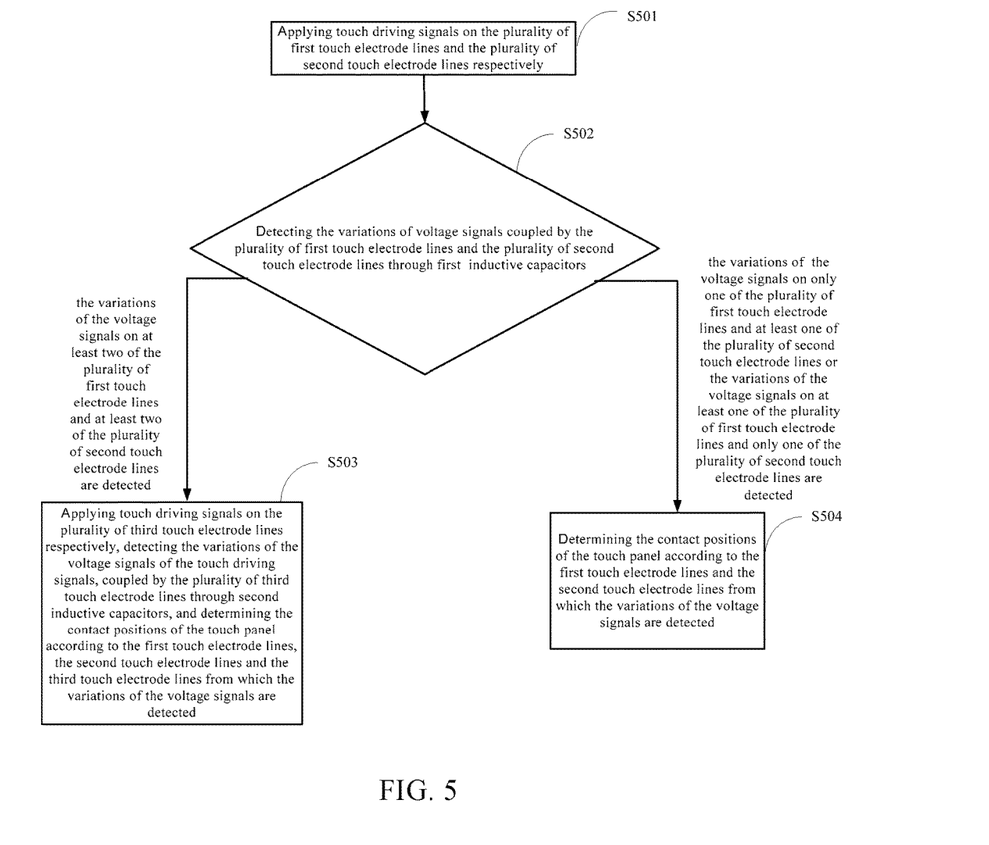
FIG. 5 is a flowchart of a touch positioning method of a touch screen panel, provided by an embodiment of the present disclosure.

According to the touch screen panel provided by the embodiments of the present disclosure, the embodiments of the present disclosure further provide a touch positioning method of the touch screen panel. The touch positioning method, as illustrated in FIG. 5, comprises the following steps:

S501: applying touch driving signals on a plurality of first touch electrode lines and a plurality of second touch electrode lines respectively.

S502: detecting variations of voltage signals coupled by the plurality of first touch electrode lines and the plurality of second touch electrode lines through first inductive capacitors, and executing a step S503 when the variations of the voltage signals on at least two of the plurality of first touch electrode lines and at least two of the plurality of second touch electrode lines are detected.

S503: applying touch driving signals on a plurality of third touch electrode lines respectively, detecting variations of voltage signals of the touch driving signals, coupled by the plurality of third touch electrode lines through second inductive capacitors, and determining the contact positions of the touch screen panel according to the first touch electrode lines, the second touch electrode lines and the third touch electrode lines from which the variations of the voltage signals are detected.

For example, in the method provided by the embodiments of the present disclosure, as illustrated in FIG. 5, the step S504 is executed when the variations of the voltage signals on only one of the plurality of first touch electrode lines and at least one of the plurality of second touch electrode lines are detected or the variations of the voltage signals on at least one of the plurality of first touch electrode lines and only one of the plurality of second touch electrode lines are detected.

S504: determining the contact positions of the touch screen panel according to the first touch electrode lines and the second touch electrode lines from which the variations of the voltage signals are detected. Upon determining the variations of the voltage signals on only one of the plurality of first touch electrode lines and at least one of the plurality of second touch electrode lines or determining the variations of the voltage signals on at least one of the plurality of first touch electrode lines and only one of the plurality of second touch electrode lines, the positions of real contacts can be accurately determined only through the first touch electrode lines and the second touch electrode lines, and no touch driving signal is required to be applied to the third touch electrode lines. Thus, the power consumption of the touch screen panel can be reduced.

In the touch module, the touch screen panel, the touch positioning method thereof and the display device provided by the embodiments of the present disclosure, the touch screen panel is additionally provided with the plurality of third touch electrode lines which are intersected with and insulated from the first touch electrode lines and the second touch electrode lines. And the intersections of the orthographic projections of the plurality of first touch electrode lines on the film layer provided with the third touch electrode lines and the orthographic projections of the plurality of second touch electrode lines on the film layer provided with the third touch electrode lines are disposed on the third touch electrode lines. Thus, when the positions of a plurality of contacts cannot be accurately determined by the first touch electrode lines and the second touch electrode lines, the ghost points can be excluded by additional third touch electrode lines, and the positions of the plurality of contacts can be accurately determined. Further, the positions of the plurality of contacts are not determined by algorithm, so that the touch screen panel can implement a multi-touch function under any condition.

What are described above is related to the illustrative embodiments of the disclosure only and not limitative to the scope of the disclosure; the scopes of the disclosure are defined by the accompanying claims.

The application claims priority to the Chinese patent application No. 201510427884.3, filed Jul. 20, 2015, the disclosure of which is incorporated herein by reference as part of the application.

What is claimed is:

1. A touch module, comprising:
    a plurality of first touch electrode lines and a plurality of second touch electrode lines which are intersected with and insulated from each other;
    a plurality of third touch electrode lines which are intersected with and insulated from the first touch electrode lines and the second touch electrode lines, wherein
    intersections of orthographic projections of the plurality of first touch electrode lines on a film layer provided with the third touch electrode lines and orthographic projections of the plurality of second touch electrode lines on the film layer provided with the third touch electrode lines are located on the third touch electrode lines, and
    the intersections of the orthographic projections of the plurality of first touch electrode lines on the film layer provided with the plurality of third touch electrode lines and the orthographic projections of the plurality of second touch electrode lines on the film layer provided with the plurality of third touch electrode lines are respectively located on different third touch electrode lines and are in one-to-one correspondence with the third touch electrode lines.

2. The touch module according to claim 1, wherein a film layer provided with the plurality of first touch electrode lines, a film layer provided with the plurality of second touch electrode lines and the film layer provided with the plurality of third touch electrode lines are disposed in different layers.

3. The touch module according to claim 2, further comprising: insulating layers disposed between the film layer provided with the plurality of first touch electrode lines and the film layer provided with the plurality of second touch electrode lines.

4. The touch module according to claim 3, wherein the plurality of third touch electrode lines are disposed in a same film layer; and
    the plurality of third touch electrode lines are parallel to each other.

5. The touch module according to claim 2, wherein the plurality of third touch electrode lines are disposed in a same film layer; and
    the plurality of third touch electrode lines are parallel to each other.

6. The touch module according to claim 2, wherein the plurality of third touch electrode lines are disposed in at least two film layers;
    the third touch electrode lines in a same film layer are parallel to each other; and the third touch electrode lines in different film layers are intersected with each other.

7. The touch module according to claim 2, further comprising: insulating layers disposed between the film layer provided with the plurality of second touch electrode lines and the film layer provided with the plurality of third touch electrode lines.

8. The touch module according to claim 1, wherein the plurality of third touch electrode lines are disposed in a same film layer; and
    the plurality of third touch electrode lines are parallel to each other.

9. The touch module according to claim 1, wherein the plurality of third touch electrode lines are disposed in at least two film layers;
    the third touch electrode lines in a same film layer are parallel to each other; and the third touch electrode lines in different film layers are intersected with each other.

10. A touch screen panel, comprising: the touch module according to claim 1.

11. The touch screen panel according to claim 10, further comprising a display panel, wherein
    the display panel comprises an upper substrate and a lower substrate which are disposed opposite to each other;

the touch module is disposed on a side of the upper substrate facing the lower substrate; or the touch module is disposed on a side of the lower substrate facing the upper substrate.

12. A display device, comprising: the touch screen panel according to claim 10.

13. A touch positioning method of the touch screen panel according to claim 10, comprising:
applying touch driving signals on the plurality of first touch electrode lines and the plurality of second touch electrode lines;
detecting variations of voltage signals of the touch driving signals, coupled by the plurality of first touch electrode lines and the plurality of second touch electrode lines through first inductive capacitors; and
when the variations of the voltage signals on at least two of the plurality of first touch electrode lines and at least two of the plurality of second touch electrode lines are detected, applying touch driving signals on the plurality of third touch electrode lines, detecting the variations of the voltage signals of the touch driving signals coupled by the plurality of third touch electrode lines through second inductive capacitors, and determining contact positions of the touch screen panel according to the first touch electrode lines, the second touch electrode lines and the third touch electrode lines from which the variations of the voltage signals are detected.

14. The method according to claim 13, further comprising:
upon determining the variations of the voltage signals on only one of the plurality of first touch electrode lines and at least one of the plurality of second touch electrode lines or determining the variations of the voltage signals on at least one of the plurality of first touch electrode lines and only one of the plurality of second touch electrode lines, determining the contact positions of the touch screen panel according to the first touch electrode lines and the second touch electrode lines from which the variations of the voltage signals are detected.

15. The touch module according to claim 1, further comprising: insulating layers disposed between the film layer provided with the plurality of second touch electrode lines and the film layer provided with the plurality of third touch electrode lines.

* * * * *